United States Patent
Altaf et al.

(10) Patent No.: US 10,776,408 B2
(45) Date of Patent: Sep. 15, 2020

(54) NATURAL LANGUAGE SEARCH USING FACETS

(71) Applicant: INTERNATIONAL BUESINESS MACHINES CORPORATION, Armonk, NY (US)

(72) Inventors: Faheem Altaf, Pflugerville, TX (US); Lisa Seacat Deluca, Baltimore, MD (US); Raghuram Srinivas, McKinney, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 15/403,300

(22) Filed: Jan. 11, 2017

(65) Prior Publication Data
US 2018/0196869 A1 Jul. 12, 2018

(51) Int. Cl.
*G06F 16/332* (2019.01)
*G06F 16/338* (2019.01)
*G06F 16/36* (2019.01)

(52) U.S. Cl.
CPC ........ *G06F 16/3326* (2019.01); *G06F 16/338* (2019.01); *G06F 16/3323* (2019.01); *G06F 16/3329* (2019.01); *G06F 16/36* (2019.01)

(58) Field of Classification Search
CPC ........... G06F 17/30864; G06F 17/3053; G06F 17/30554; G06F 17/30867;
(Continued)

(56) References Cited

U.S. PATENT DOCUMENTS

| 7,146,362 | B2 | 12/2006 | Allen et al. |
| 7,840,589 | B1 | 11/2010 | Holt et al. |

(Continued)

FOREIGN PATENT DOCUMENTS

| WO | 02073530 A1 | 9/2002 |
| WO | 03069554 A2 | 8/2003 |

(Continued)

OTHER PUBLICATIONS

Gibbs, Martin, "Database Query: Definition & Tools." Study.com, May 19, 2016, <study.com/academy/lesson/database-query-definition-tools.html>, pp. 1-2 (Year: 2016).*

(Continued)

*Primary Examiner* — James Trujillo
*Assistant Examiner* — Michal Bogacki
(74) *Attorney, Agent, or Firm* — Stephanie Carusillo, Esq.; Hye Jin Lucy Song, Esq.; Heslin Rothenberg Farley & Mesiti P.C.

(57) ABSTRACT

Methods, computer program products, and systems are presented. The methods include, for instance: obtaining a query for a search result and identifying at least one entity in the query, discovering a facet-entity mapping corresponding to the entity from a knowledgebase. A facet in the facet-entity mapping is a property configured in the knowledgebase and an entity is an instance of the facet. The facet-entity mapping is displayed for the user and the query is searched from content, and the search result presented based on the facet and the entity from the facet-entity mapping.

17 Claims, 6 Drawing Sheets

(58) Field of Classification Search
CPC ......... G06F 17/30967; G06F 17/30651; G06F 17/3043; G06F 17/30731; G06F 17/30424; G06F 17/30648; G06F 17/30699; G06F 17/30696; G06F 17/30654; G06F 17/30646; G06F 16/3326; G06F 16/3323; G06F 16/36; G06F 16/3329; G06F 16/338; G06N 5/02
See application file for complete search history.

(56) References Cited

U.S. PATENT DOCUMENTS

| | | | |
|---|---|---|---|
| 8,655,869 B2 | 2/2014 | Ferrari et al. | |
| 8,983,930 B2 | 3/2015 | Cheng et al. | |
| 9,354,790 B2 | 5/2016 | Scherpa et al. | |
| 2004/0068627 A1* | 4/2004 | Sechrest | G06F 12/121 711/158 |
| 2007/0106658 A1* | 5/2007 | Ferrari | G06F 16/904 |
| 2009/0198675 A1* | 8/2009 | Mihalik | G06F 17/30864 |
| 2012/0221932 A1* | 8/2012 | Gleadall | G06F 17/30902 715/208 |
| 2012/0226681 A1 | 9/2012 | Paparizos et al. | |
| 2012/0265784 A1* | 10/2012 | Hsu | G06F 16/3322 707/771 |
| 2012/0324367 A1* | 12/2012 | Ilyas | G06F 17/30867 715/747 |
| 2013/0132236 A1 | 5/2013 | Gokturk et al. | |
| 2013/0238631 A1* | 9/2013 | Carmel | G06F 17/30604 707/742 |
| 2014/0181100 A1* | 6/2014 | Ramer | H04L 67/22 707/728 |
| 2014/0229467 A1 | 8/2014 | Roseman et al. | |
| 2014/0267167 A1* | 9/2014 | Ricks | G06F 3/041 345/175 |
| 2015/0066711 A1 | 3/2015 | Chua et al. | |
| 2015/0242441 A1 | 8/2015 | Ramesh et al. | |
| 2016/0063993 A1* | 3/2016 | Dolan | G10L 15/08 704/254 |
| 2016/0140643 A1 | 5/2016 | Nice et al. | |
| 2016/0328108 A1* | 11/2016 | Li | G06F 3/0485 |
| 2017/0056764 A1* | 3/2017 | Shukla | H04L 67/22 |
| 2018/0157716 A1* | 6/2018 | Constandt | G06F 17/30646 |
| 2018/0181611 A1* | 6/2018 | Harsha | G06F 16/2455 |
| 2018/0204111 A1* | 7/2018 | Zadeh | G06N 3/0454 |

FOREIGN PATENT DOCUMENTS

| | | |
|---|---|---|
| WO | 2009117835 A1 | 10/2009 |
| WO | 2012067586 A1 | 5/2012 |

OTHER PUBLICATIONS

Quackit, "Querying a Database", 2020 (no date given), quackit.com, Database Tutorial ch. 7, <https://www.quackit.com/database/tutorial/querying_a_database.cfm>, pp. 1-2, (Year: 2020).*

Dave Kushal, et al.; "Mining the Peanut Gallery: Opinion Extraction and Semantic Classification of Product Reviews." Proceedings of the 12th international conference, ACM, 2012, 10 pgs.

Hai, Zhen, et al.; "One Seed to Find Them All: Mining Opinion Features via Association." Proceedings of the 21st International Conference on information, ACM, 2012, 10 pgs.

Mell, Peter, et al., "The NIST Definition of Cloud Computing", NIST Special Publication 800-145, Sep. 2011, Gaithersburg, MD, 7 pgs.

* cited by examiner

NATURAL LANGUAGE SEARCH USING FACETS

TECHNICAL FIELD

The present disclosure relates to search optimization, and more particularly to methods, computer program products, and systems for searching based on facets of a search query.

BACKGROUND

Conventional search techniques are based on keywords and search results are often discovered as having keywords or words stemming from keywords. Most text indexing systems also use keyword-based approaches and do not take common stop words into account. Consequently, keyword-based search engines attempt to match keyword from a search query with searched contents in generating search results.

SUMMARY

The shortcomings of the prior art are overcome, and additional advantages are provided, through the provision, in one aspect, of a method. The method for a facet-based search includes, for example: obtaining, by one or more processor of a computer, a query for a search result from a user; identifying at least one entity in the query, wherein an entity of the at least one entity is an instance of a facet that is a configured property in a knowledgebase; discovering a facet-entity mapping corresponding to the identified entity in the query, the facet-entity mapping being available from the knowledgebase, the facet-entity mapping comprising the entity and the facet; and displaying, the facet-entity mapping before transmitting the query for the search result from the user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
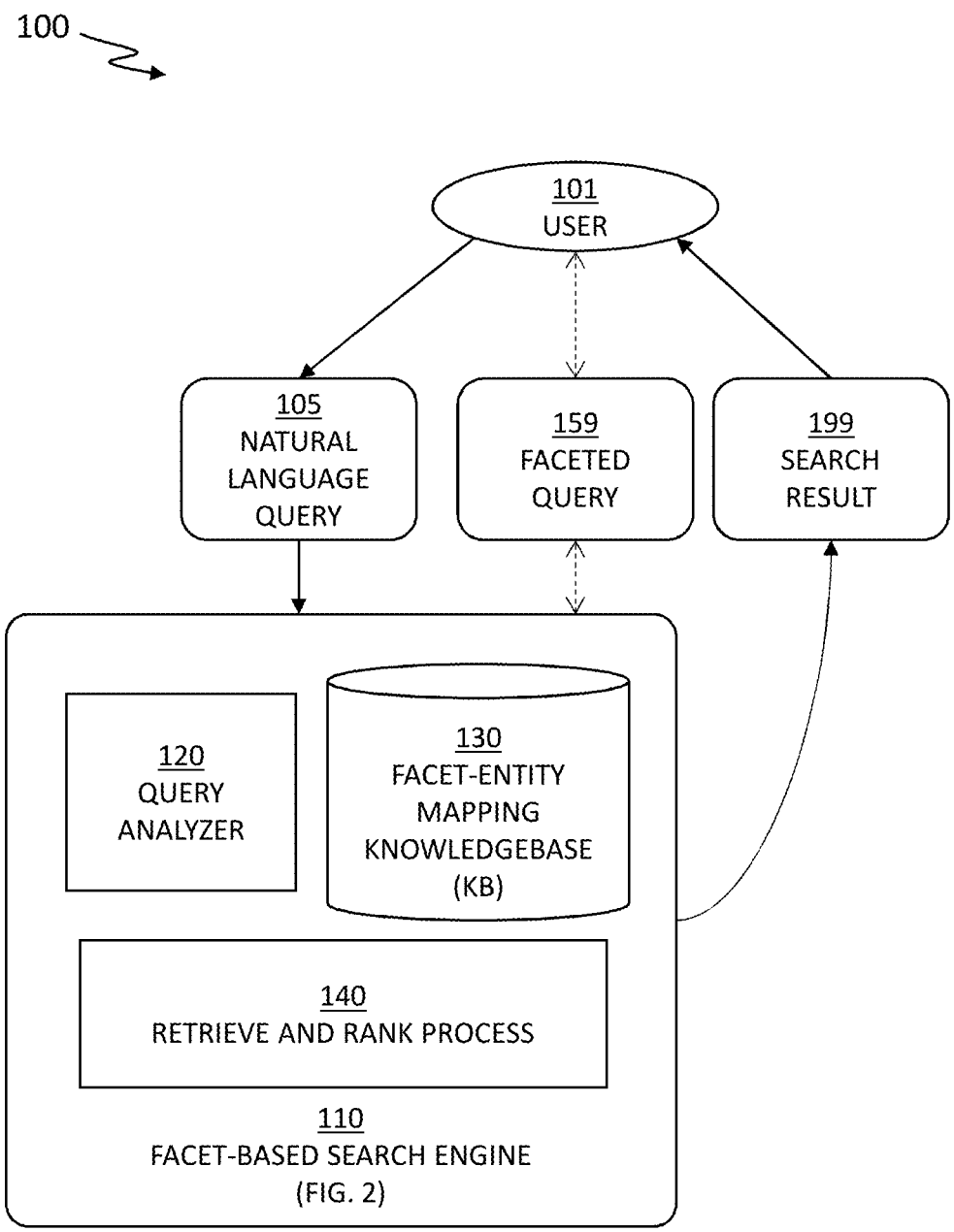
FIG. 1 depicts a system 100 for a facet-based search, in accordance with one or more embodiments set forth herein.

FIG. 1 depicts a system 100 for a facet-based search, in accordance with one or more embodiments set forth herein.

The system 100 includes a user 101 and a facet-based search engine 110. The user 101 inputs a natural language query 105, or simply a query, for a search to the facet-based search engine 110, which in response presents a faceted query 159 including zero (0) or more facets in the natural language query 105. The user 101 may further adjust the faceted query 159 by turning off a specific facet from the faceted query 159 as presented by the facet-based search engine 110. The facet-based search engine 110 produces a search result 199 to the user 101 upon receiving a search command for the natural language query 105. The search result 199 includes zero (0) or more matches from subject content that is responsive to the natural language query 105. The search result 199 may be based on facet-entity or keyword, if no facet-entity is applicable. The subject content to be searched may be in a domain, or over multiple domains. In this specification, the term "facet" indicates a clearly defined property/aspect of an object, enabling multiple ways of classification, ranking, and/or filtering for objects in information retrieval, navigation, and/or browsing, such as a product type, a brand, color/size, a price range, or similar features in case for a merchandise.

The facet-based search engine 110 includes functional elements of a query analyzer 120, a facet-entity mapping knowledgebase (KB) 130, and a retrieve and rank process 140. The query analyzer 120 processes the natural language query 105 input by the user 101 for entities that are associated with respective facets. In this specification, the term "entity" indicates an instance of a facet, such as "yard" entity for a "Department" facet, "blue" entity for a "Color" facet, etc. The facet-entity mapping KB 130 stores mappings of entities with respectively corresponding facets such that entities present in the natural language query 105 may relate to respective facets. The retrieve and rank process 140 may utilize a facet as a retrieve and rank criteria and accordingly performs a search of a domain for the facets as discovered from the facet-entity mapping KB 130 and ranks matches in the search result based on the facets. Wherein no facet-entity mapping is identified or the user 101 de-selects all facet-entity mapping identified from the facet-entity mapping KB 130, the retrieve and rank process 140 may perform a search for all available content of one or more domain and rank the result based on relevance to the natural language query 105, as in conventional retrieve and rank as performed by conventional keyword-based search engines, or based on the default configuration of the facet-based search engine 110.

In contrast to conventional search engines that perform searches only based on keywords of a query and/or a group of words as generated by stemming from the keywords, the facet-based search engine 110 emphasizes the meaning of the natural language query 105 as a whole as provided by the user 101, and consequently has advantages over conventional keyword-based search engines in producing meaningful results by distinguishing a particular meaning amongst multiple meaning of a same word, homographs/homonyms of a word from the natural language query 105 based on context and overall meaning. Further, the facets of the natural language query 105 may be interactively de-selected from the faceted query 159 such that the user 101 may control whether or not to use the faceted search functionality, in which case a conventional keyword-based search may be performed.

Figure 2:
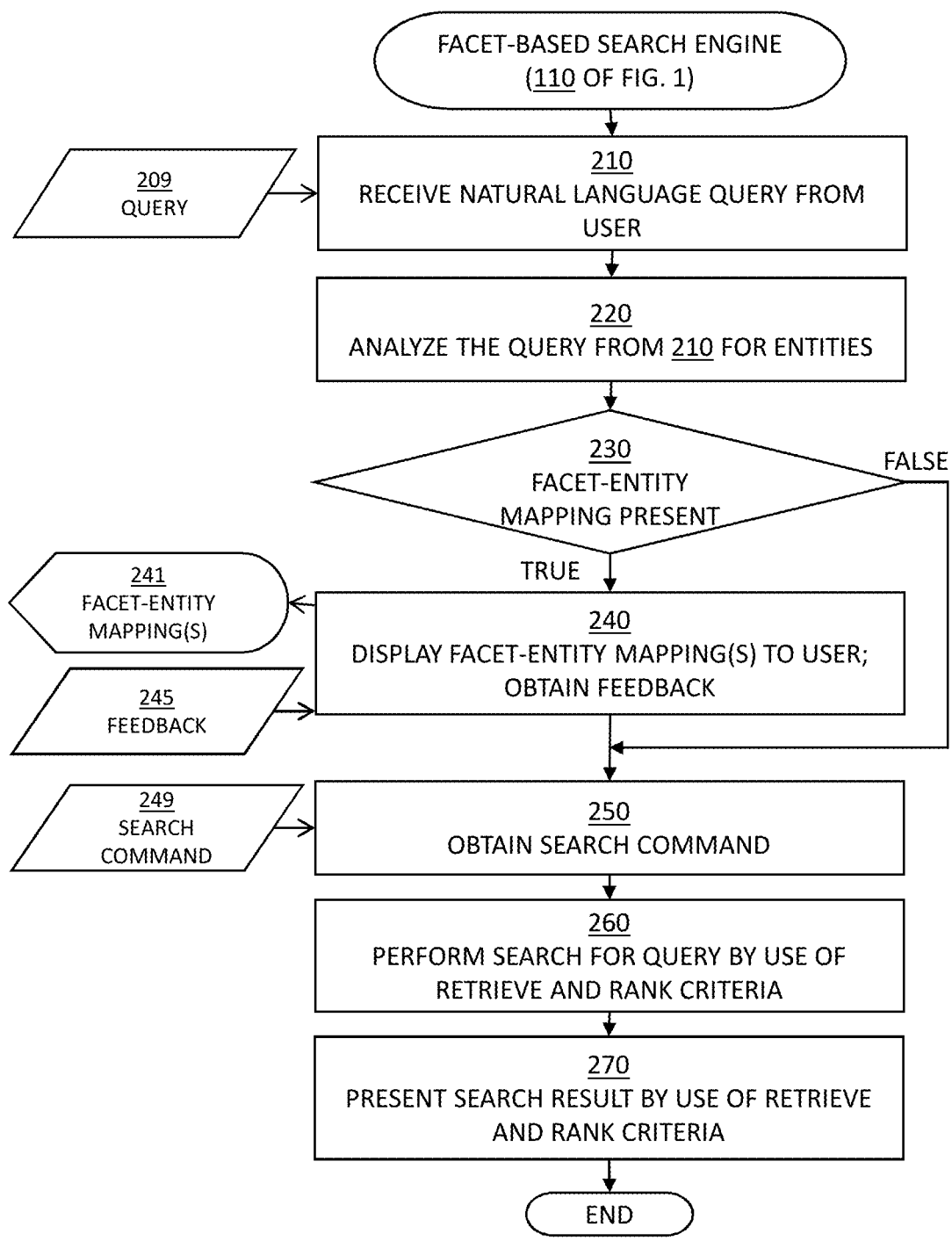
FIG. 2 depicts a flowchart performed by the facet-based search engine, in accordance with one or more embodiments set forth herein.
Figure 3:
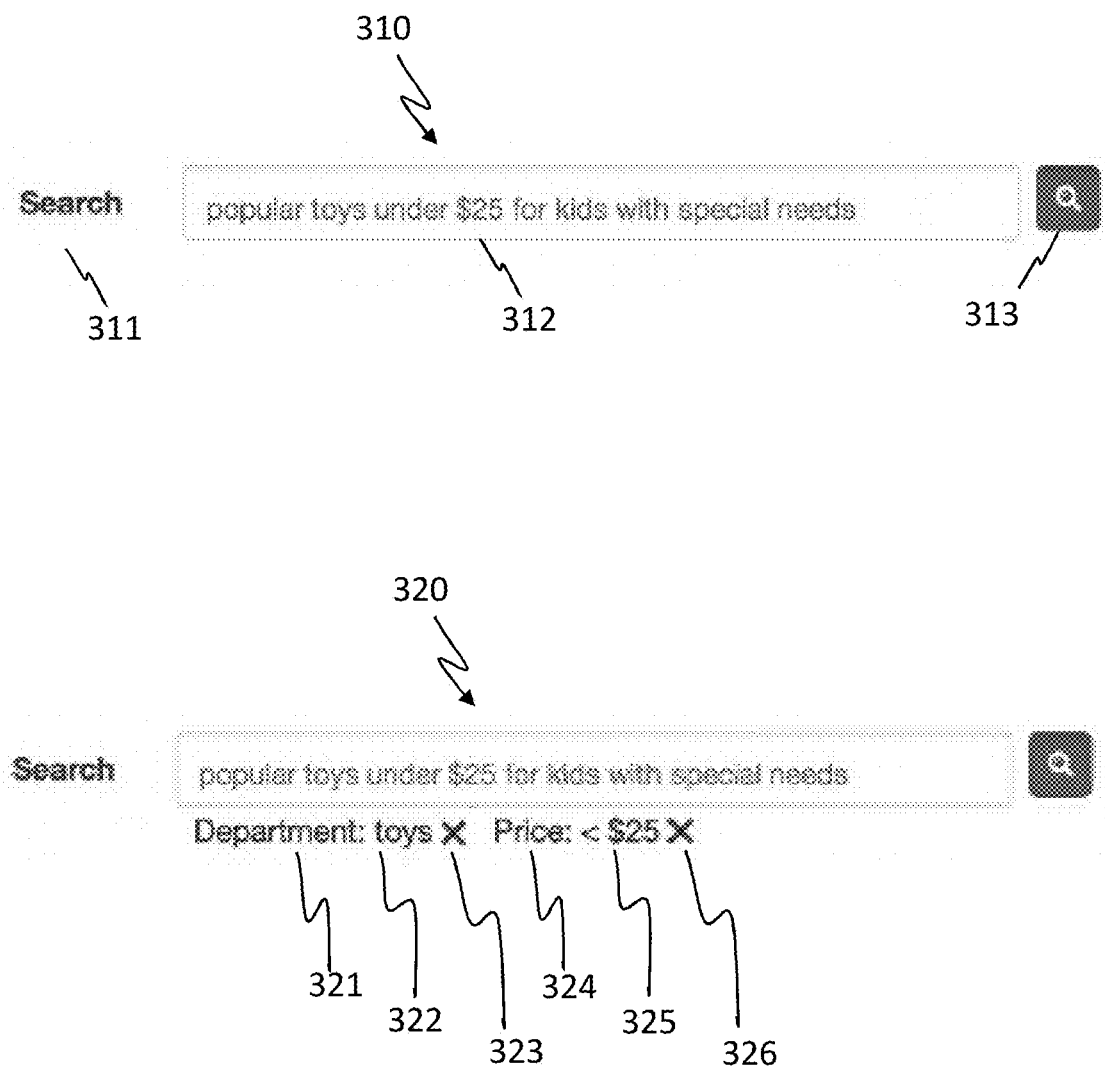
FIG. 3 depicts an exemplary query and an exemplary facet-entity mappings display for the query, in accordance with one or more embodiments set forth herein.

FIG. 2 depicts a flowchart performed by the facet-based search engine 110 of FIG. 1, and FIG. 3 depicts an exemplary query and an exemplary facet-entity mappings display for the query, in accordance with one or more embodiments set forth herein.

In block 210, the facet-based search engine 110 receives a query in natural language from the user. Block 209 indicates the query is provided to block 210 as data. Upon completion of typing of the query by the user, as represented by block 209, the facet-based search engine 110 performs block 210. Then the facet-based search engine 110 proceeds with block 220.

An exemplary query for block 209 query in accordance with one or more embodiments of the present invention is presented in FIG. 3. A first screenshot 310 of FIG. 3 includes a Search text box title 311, an input text box 312 for a search query, and a search command button 313. The exemplary query stating "popular toys under $25 for kids with special needs" had been typed into the input text box 312 by the user prior to block 210.

In block 220, the facet-based search engine 110 analyzes the query received in block 210 in order to identify entities that are instances of corresponding facets. The facet-based search engine 110 may utilize external natural language processing (NLP) services in identifying the entities from the query 209. For example, in the context of a home improvement store, the facet-based search engine 110 may include facets such as Department, Price, etc. When a query "grass not growing in yard" is received, the facet-based search engine 110 may extract "yard" as an entity by use of entity extraction application programming interfaces (APIs), and set "yard" as an instance of the Department facet to optimize a search such that the query "grass not growing in yard" would be searched only in Garden/Outdoor living Department instead of being searched in all departments of the domain of the home improvement store. In one embodiment of the present invention, the facet-based search engine 110 employs the IBM Watson™ Natural Language Classifier service which uses machine learning algorithms to return top-matching predefined classes for short text inputs, for entity analysis. In the same embodiment of the present invention, entity extraction of contents in a domain and/or of the query from block 209 may be performed by use of entity extraction APIs by the IBM® AlchemyAPI®. (IBM and AlchemyAPI are registered trademarks of International Business Machines Corporation in the United States and other countries; and IBM Watson is a trademark of International Business Machines Corporation in the United States and other countries.) Then the facet-based search engine 110 proceeds with block 230.

In block 230, the facet-based search engine 110 determines whether or not one or more facet-entity mapping is discovered from the facet-entity mapping KB 130. All of the entities discovered from the query in block 220 are respectively checked for a facet-entity mapping against the facet-entity mapping KB 130. If the facet-based search engine 110 determines that one or more facet-entity mapping is discovered, then the facet-based search engine 110 proceeds with block 240. If the facet-based search engine 110 determines that no facet-entity mapping is discovered at all, then the facet-based search engine 110 proceeds with block 250.

In block 240, the facet-based search engine 110 displays the one or more facet-entity mapping discovered from block 230 to the user and may obtain a feedback on each facet-entity mapping from the user. Block 241 indicates that the facet-based search engine 110 displays the one or more facet-entity mapping for the query to the user. Block 245 indicates that the user may provide a feedback on the facet-entity mapping presented in block 241 to the facet-based search engine 110, by which the user may de-select the facets identified as relevant to the entities of the query 209. The facet-entity display 241 and the feedback 245 ensures that the user may choose not to use the facet-entity mapping as identified by the facet-based search engine 110 in case the facets had not been identified pursuant to the intent of the user. Then the facet-based search engine 110 proceeds with block 250.

A second screenshot 320 of FIG. 3 depicts an exemplary facet-entity mapping display for the exemplary query for block 209 presented in the first screenshot 310. The search text box title 311, the input text box 312 with the exemplary query, and the search command button 313 from the first screenshot 310 are presented along with the exemplary facet-entity mapping display, which includes a first facet 321 "Department", a first entity 322 "toys", a first turn-off button 323 corresponding to a first mapping of the first facet 321 and the first entity 322, a second facet 324 "Price", a second entity 322 "<$25", and a second turn-off button 326 corresponding to a second mapping of the second facet 324 and the second entity 325. The first turn-off button 323 and the second turn-off button 326 may be respective on-off buttons such that the user may provide feedback more than once for each facet-entity mapping. In the second screenshot 320, a third entity of "special needs" may be extracted and a third facet corresponding to the third entity may be present in the facet-entity mapping KB 130, according to the configuration of the facet-based search engine 110 and the facet-entity mapping KB 130. If the user provides a feedback of clicking a first turn-off button 323 and/or a second turn-off button 326, a facet-entity mapping corresponding to the clicked turn-off button will be de-selected and the facet-based search engine 110 may perform a search for the exemplary query without the de-selected facet-entity mapping.

In block 250, the facet-based search engine 110 obtains a search command from the user, to perform a search on the query 209 according to the facet-entity mapping as adjusted by the feedback 245 from the user. Block 249 of the search command is input to the facet-based search engine 110 when the user clicks the search command button 313 of FIG. 3, or when the user strokes the Enter key at the end of the typed-in query, etc., based on the configuration of the facet-based search engine 110. Then the facet-based search engine 110 proceeds with block 260.

In block 260, the facet-based search engine 110 performs a search by use of a retrieve and rank criteria and discovers a search result including zero (0) or more matches for the query 209 from content of a subject domain. The retrieve and rank criteria may include facets and entities in cases the facet-entity mapping had been discovered in block 230 and kept by the user from the feedback 245 in block 240. Wherein no facet-based search is applicable, the retrieve and rank criteria for the facet-based search engine 110 would be one or more keyword of the query, to perform a keyword-based search by default instead of a facet-based search. Wherein the retrieve and rank criteria are the facets and entities, the facet-based search engine 110 may improve search efficiency and accuracy by limiting the scope of the search only to the relevant facets, which is referred to as a filtering. The filtering may be performed as the user is typing the query, as the user is speaking the query, when the user pauses during entry of the query, and/or while the user hovers over a portion of the query. Then the facet-based search engine 110 proceeds with block 270.

In block 270, the facet-based search engine 110 presents the search result including zero (0) or more matches for the query 209 in order based on the retrieve and rank criteria, which may include the facet-entity mapping where available as noted in block 260. The search result may be ordered based on, for example, matching facet-entity mapping(s), relevance of respective search results to the query based on a scoring scheme for search results, etc., based on the configuration of the facet-based search engine 110. Then the facet-based search engine 110 terminates processing the query from block 209.

Certain embodiments of the present invention may offer various technical computing advantages, including a more accurate recognition of a natural language search query by use of facet analysis of the query than a conventional keyword analysis of the query. Certain embodiments of the present invention also implement a facet-based search that utilizes facets identified in the query by limiting the scope of search the identified facets, which is more efficient than a keyword-based search against every available content based on keywords from the query. Certain embodiments of the present invention utilizes natural language classifier services such that the query may be accurately analyzed in terms of discovered entities in the query. Certain embodiments of the present invention also further facilitate user feedback on facet analysis results of the query such that the context of the query may be more accurately applied. Further, certain embodiments of the present invention implement a search and rank service based on facet-entity presence in the query such that the user may acquire rank information of search results.

Figure 4:
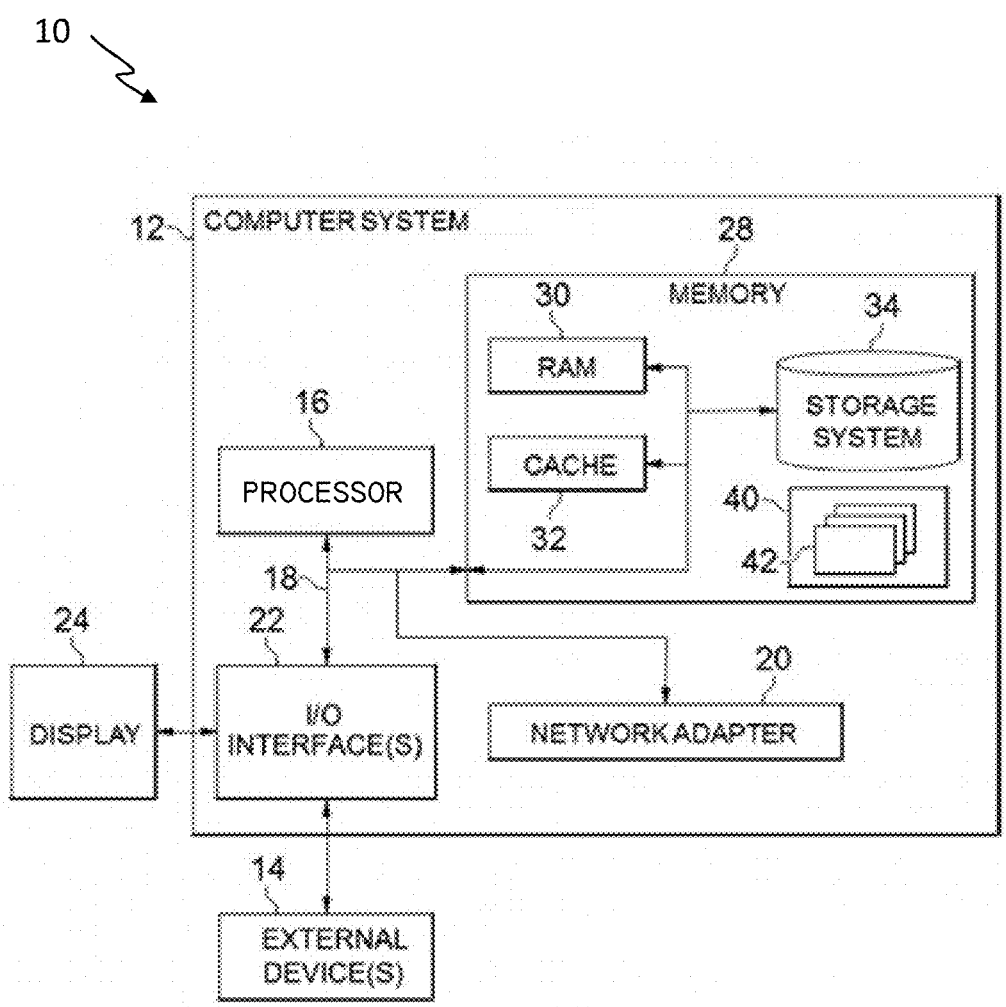
FIG. 4 depicts a cloud computing node according to an embodiment of the present invention.
Figure 5:
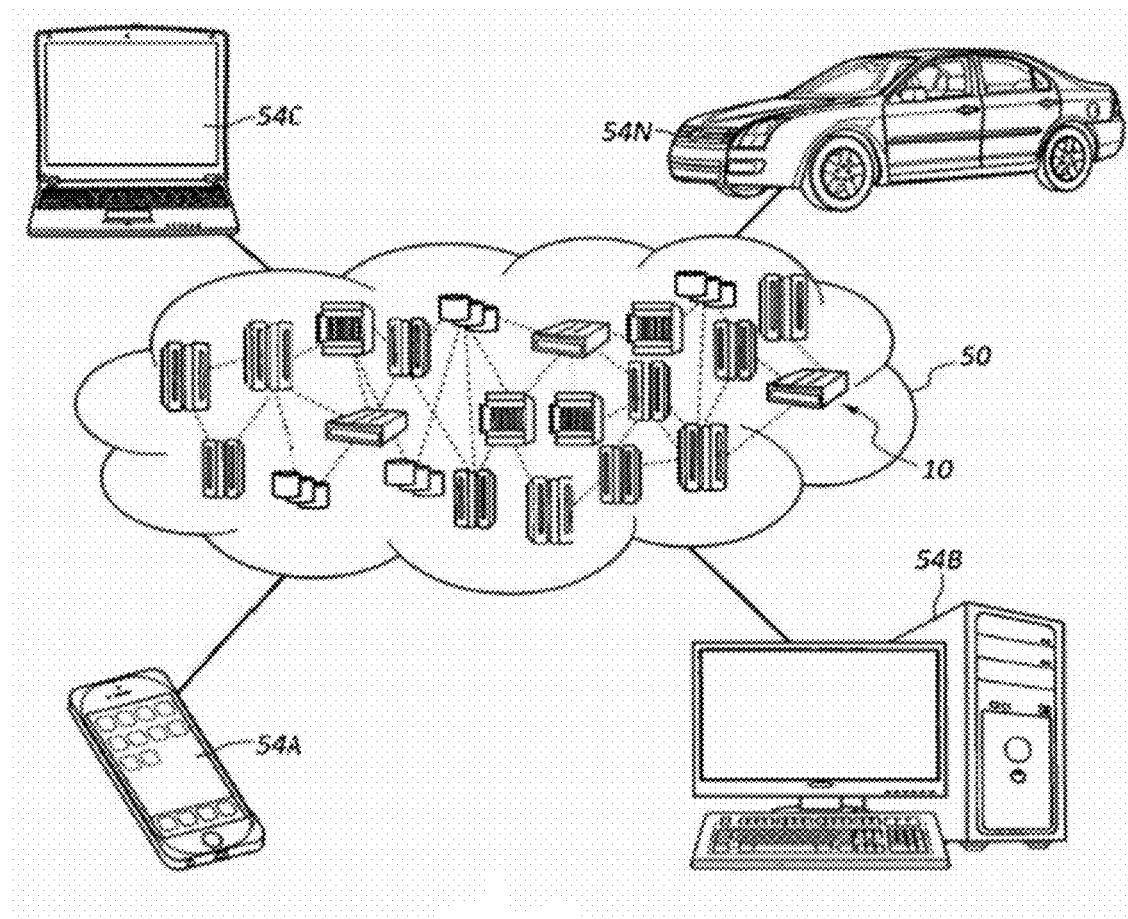
FIG. 5 depicts a cloud computing environment according to an embodiment of the present invention.
Figure 6:
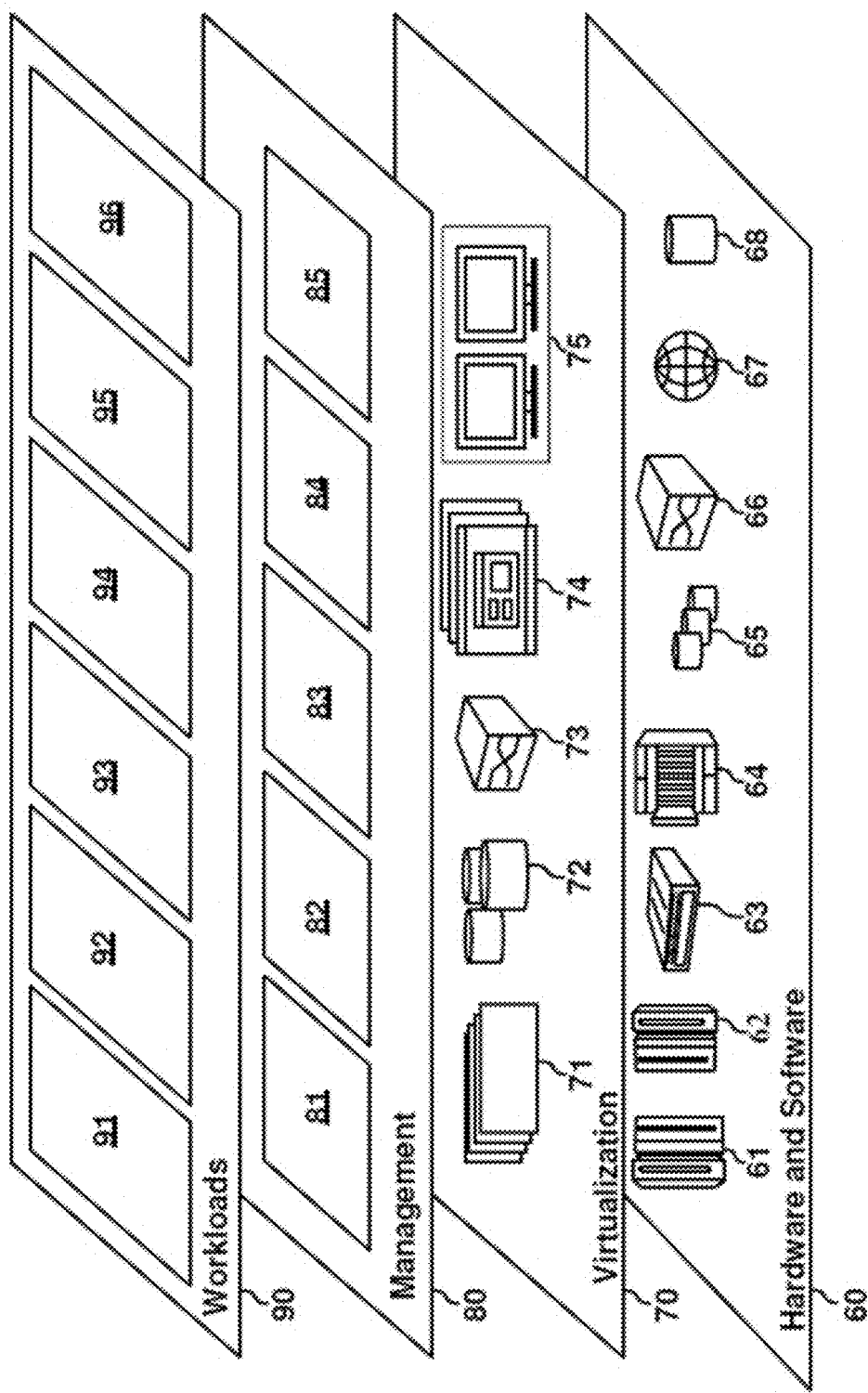
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the facet-based search engine 110 of FIG. 1. Program processes 42, as in the facet-based search engine 110, the query analyzer 120, the facet-entity mapping knowledgebase 130, and the retrieve and rank process 140 of FIG. 1, respectively, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the facet-based search engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for a facet-based search, comprising:
    obtaining, by one or more processor of a computer, a query for a search result from a user;
    identifying at least one entity in the query, by use of an entity extraction application programming interface (API) utilizing machine learning based natural language processing tools, the entity extraction API returns, as the at least one entity, top-matching predefined classes present in the query and contents of one or more domain subject to the facet-based search, wherein an entity of the at least one entity is an instance of a facet amongst a plurality of facets that are configured in a knowledgebase for classification of the contents of the one or more domain;
    discovering a facet-entity mapping corresponding to the identified entity in the query, the facet-entity mapping being available from the knowledgebase, the facet-entity mapping comprising the entity and the facet; and
    displaying the facet-entity mapping before transmitting the query for the search result from the user.

2. The computer implemented method of claim 1, further comprising;
    setting the facet and the entity from the facet-entity mapping to modify the search result for the user, based on a feedback by the user on the facet-entity mapping responsive to the displaying.

3. The computer implemented method of claim 2, further comprising:
    filtering out content having a corresponding facet that is unrelated to the facet of the facet-entity mapping from searching by the query for the search result.

4. The computer implemented method of claim 3, wherein the filtering is performed during one occasion selected from the group consisting of: as the user is typing the query, as the user is speaking the query, when the user pauses during entry of the query, and on hover of a portion of the query.

5. The computer implemented method of claim 1, further comprising:
    ascertaining that no facet-entity mapping is remaining for the facet-based search that the user had de-selected the displayed facet-entity mapping by use of a feedback by the user on the facet-entity mapping responsive to the displaying; and
    generating and presenting the search result based on at least one keyword from the query.

6. A computer program product comprising:
    a computer readable storage medium readable by one or more processor and storing instructions for execution by the one or more processor for performing a method for a facet-based search, comprising:
        obtaining, by the one or more processor, a query for a search result from a user;
        identifying at least one entity in the query, by use of an entity extraction application programming interface (API) utilizing machine learning based natural language processing tools, the entity extraction API returns top-matching predefined classes present in the query and contents of one or more domain subject to the facet-based search, wherein an entity of the at least one entity is an instance of one or more facet amongst a plurality of facets that are configured in a knowledgebase for classification of the contents of the one or more domain;

discovering one or more facet-entity mapping corresponding to the identified entity in the query, the one or more facet-entity mapping being available from the knowledgebase, the one or more facet-entity mapping comprising the entity and each of the one or more facet;

displaying, the one or more facet-entry mapping before transmitting the query for the search result from the user.

7. A system comprising:

a memory;

one or more processor in communication with the memory; and program instructions executable by the one or more processor via the memory to perform a method for a facet-based search, comprising:

obtaining, by the one or more processor, a query for a search result from a user;

identifying at least one entity in the query, by use of an entity extraction application programming interface (API) utilizing machine learning based natural language processing tools, the entity extraction API returns, as the at least one entity, top-matching pre-defined classes present in the query and contents of one or more domain subject to the facet-based search, wherein an entity of the at least one entity is an instance of a facet that is a configured property in a knowledgebase for classification of the contents of the one or more domain;

discovering a facet-entity mapping corresponding to the identified entity in the query, the facet-entity mapping being available from the knowledgebase, the facet-entity mapping comprising the entity and the facet; and displaying, the facet-entry mapping before transmitting the query for the search result from the user.

8. The system of claim 7, wherein the displaying of the discovered facet-entity mapping includes a corresponding turn-off button such that the user may provide a feedback that de-selects the discovered facet-entity mapping.

9. The system of claim 8, further comprising:

setting the facet and the entity from the facet-entity mapping to modify the search result for the user.

10. The system of claim 9, wherein retrieve and rank criteria for the facet-based search are set based on the facet and the entity, further comprising:

filtering out content having a corresponding facet that is unrelated to the facet of the facet-entity mapping from searching by the query for the search result, wherein the filtering is performed during one occasion selected from the group consisting of: as the user is typing the query, as the user is speaking the query, when the user pauses during entry of the query, and on hover of a portion of the query.

11. The computer implemented method of claim 1, the displaying comprising;

providing at least one turn-off button respectively corresponding to each of at least one facet-entity mapping including the facet-entity mapping from the discovering in order for the user to give a feedback by turning off each of the facet-entity mapping individually to thereby adjust facets applicable for the query in the facet-based search.

12. The computer implemented method of claim 11, further comprising:

configuring the facet and the entity from the facet-entity mapping as one of retrieve-and-rank criteria for the search result, wherein the retrieve-and-rank criteria are applicable for limiting a scope of subject content to search and for ordering matches in the search result.

13. The computer implemented method of claim 3, further comprising:

generating the search result by searching for the facet-entity mapping of the query against a subject content resulting from the filtering.

14. The computer implemented method of claim 13, wherein the subject content comprises content respective to the one or more domain.

15. The computer implemented method of claim 11, further comprising:

obtaining the feedback from the user via the turn-off button corresponding to the facet-entity mapping;

obtaining a search command for the query from the user;

identifying the search result by searching for selected facet-entity mapping of the query against a subject content, wherein the selected facet-entity mapping results from the feedback, wherein the subject content includes content respective to the one or more domain;

filtering out content having a corresponding facet that is unrelated to the facet of the facet-entity mapping from the search result from the identifying the search result; and presenting the search result on the query to the user in order of retrieve and rank criteria for the search result from the filtering.

16. The computer implemented method of claim 15, wherein the search command is provided by the user based on configuration of the search command, selected from the group consisting of a click on a search command button and an Enter key input after typing in the query.

17. The computer program product of claim 6, further comprising:

generating the search result on the query subsequent to obtaining the search command based on a feedback, wherein each of the one or more facet-entry mapping from the displaying includes a turn-off button corresponding to respective facet-entry mapping to thereby the user provide the feedback that de-selects the respective facet-entry mapping from the discovering, the generating comprising:

identifying the search result by searching for selected facet-entity mappings of the one or more facet-entity mapping for the query, wherein the selected facet-entity mapping indicates the one or more facet-entity mapping that remain after excluding each facet-entity mapping de-selected via the corresponding turn-off button feedback from the user, and wherein the subject content includes the one or more domain;

filtering out content having a facet of the one or more facet that is not included in the selected facet-entity mapping from the search result, according to retrieve-and-rank criteria, wherein the facet is unrelated to any facets appearing in the facet-entity mapping from the search result from the identifying; and ordering the search result from the filtering according to ranks represented in the retrieve-and-rank criteria, prior to the presenting the search result, wherein the search command is provided by the user based on configuration of the search command, selected from the group consisting of a click on a search command button and an Enter key input after typing in the query.

* * * * *